United States Patent
Minowa et al.

(10) Patent No.: US 9,829,576 B2
(45) Date of Patent: Nov. 28, 2017

(54) CLUTTER SUPPRESSING DEVICE AND RADAR APPARATUS PROVIDED WITH THE SAME

(71) Applicant: Furuno Electric Co., Ltd., Nishinomiya (JP)

(72) Inventors: Masahiro Minowa, Nishinomiya (JP); Yasunobu Asada, Nishinomiya (JP)

(73) Assignee: Furuno Electric Co., Ltd., Nishinomiya (JP)

(*) Notice: Subject to any disclaimer, the term of this patent is extended or adjusted under 35 U.S.C. 154(b) by 233 days.

(21) Appl. No.: 14/836,198

(22) Filed: Aug. 26, 2015

(65) Prior Publication Data

US 2016/0061944 A1 Mar. 3, 2016

(30) Foreign Application Priority Data

Aug. 29, 2014 (JP) .................. 2014-174763

(51) Int. Cl.
*G01S 13/52* (2006.01)
*G01S 13/524* (2006.01)
(Continued)

(52) U.S. Cl.
CPC .......... *G01S 13/524* (2013.01); *G01S 7/2806* (2013.01); *G01S 7/2923* (2013.01); *G01S 13/538* (2013.01);
(Continued)

(58) Field of Classification Search
CPC .... G01S 13/524; G01S 7/2806; G01S 7/2923; G01S 13/951; G01S 13/538; G01S 2007/2886; G01S 13/956
See application file for complete search history.

(56) References Cited

U.S. PATENT DOCUMENTS 4,658,255 A 4/1987 Nakamura et al.
4,684,950 A 8/1987 Long
(Continued)

FOREIGN PATENT DOCUMENTS

| EP | 0133002 A2 * | 2/1985 | ........... G01S 7/2923 |
| JP | 2011169829 A | 9/2011 | |
| WO | WO 8601001 A1 * | 2/1986 | ........... G01S 7/2923 |

OTHER PUBLICATIONS

Young Kil Kwang, "An adaptive clutter and interference suppression with a minimum residue noise power," Military Communications Conference, 1989. MILCOM '89. Conference Record. Bridging the Gap. Interoperability, Survivability, Security., 1989 IEEE, Boston, MA, 1989, pp. 521-525 vol. 2.*
(Continued)

*Primary Examiner* — John B Sotomayor
(74) *Attorney, Agent, or Firm* — Alleman Hall Creasman & Tuttle LLP

(57) ABSTRACT

A clutter suppressing device for suppressing echo data of reflection waves caused by radar transmission signals reflecting on a static object is provided. Each of the radar transmission signals is transmitted at a predetermined azimuth from a radar antenna at a predetermined time interval. The clutter suppressing device includes an echo data memory configured to sequentially store a plurality of echo data of reflection waves caused by the radar transmission signals reflecting on objects, a filter configured to select, from the plurality of echo data, a data row in the azimuth direction for a predetermined distance, and suppress, in the data row, echo data of a target object moving at a speed within a predetermined range, and a suppression echo data output unit configured to output suppression echo data containing the echo data suppressed by the filter.

3 Claims, 9 Drawing Sheets

(51) Int. Cl.
  *G01S 7/28*   (2006.01)
  *G01S 7/292*  (2006.01)
  *G01S 13/538* (2006.01)
  *G01S 13/95*  (2006.01)
  *G01S 7/288*  (2006.01)

(52) U.S. Cl.
  CPC ........... *G01S 13/951* (2013.01); *G01S 13/956* (2013.01); *G01S 2007/2886* (2013.01)

(56) References Cited

U.S. PATENT DOCUMENTS

| | | |
|---|---|---|
| 5,049,889 A | 9/1991 | Hol et al. |
| 5,451,961 A * | 9/1995 | Rubin .................... G01S 7/2923 342/159 |
| 7,064,704 B2 * | 6/2006 | Bergkvist ................ G01S 13/22 342/118 |
| 2006/0082493 A1 | 4/2006 | Fujikawa et al. |
| 2013/0241766 A1 * | 9/2013 | Kishigami .............. G01S 7/023 342/159 |
| 2014/0062760 A1 | 3/2014 | Asada et al. |

OTHER PUBLICATIONS

European Patent Office, Extended European Search Report Issued in Application No. 15182010.7, dated Feb. 1, 2016, Germany, 8 pages.

\* cited by examiner

CLUTTER SUPPRESSING DEVICE AND RADAR APPARATUS PROVIDED WITH THE SAME

CROSS-REFERENCE TO RELATED APPLICATION(S)

This application claims priority under 35 U.S.C. §119 to Japanese Patent Application No. 2014-174763, which was filed on Aug. 29, 2014, the entire disclosure of which is hereby incorporated by reference.

TECHNICAL FIELD

This disclosure is related to a clutter suppressing device which suppresses static clutter components contained in a reception signal of a meteorological radar, and a radar apparatus provided with the clutter suppressing device.

BACKGROUND OF THE INVENTION

Generally, meteorological radars measure precipitation by transmitting radio waves over 360° around the radar concerned and receiving reflection wave (echo) signals caused by the transmitted radio waves reflecting on cloud or rain. The reflection wave signals contain not only echo components of cloud or rain that are observation targets, but also static clutter components that are unnecessary reflection wave components caused by the transmitted radio waves reflecting on static object(s) that is not the observation target. The static clutter components mainly contain ground clutter components that are reflection wave signal components of land.

Such static clutter components cause degradation in accuracy of rain amount calculation in meteorological observation. Therefore, conventional meteorological radars are provided with signal processing devices that perform Moving Target Indicator (MTI) processing so as to suppress such static clutter components (e.g., see JP2011-169829A).

Here, in the MTI processing, a difference in intensity between a latest reflection wave signal and a reflection wave signal previous to the latest reflection wave signal by one sample is obtained, and echo components having low frequencies, in other words, static clutter components are suppressed.

However, with such a conventional signal processing device that performs the MTI processing, when the static clutter components are to be suppressed, there is a disadvantage that the echo components of cloud or rain which move comparatively slow are also suppressed, and it is difficult to improve the accuracy of rain amount calculation in meteorological observation.

SUMMARY OF THE INVENTION

The purpose of this disclosure relates to providing a clutter suppressing device which suppresses static clutter components without suppressing echo components of observation target(s) moving at a comparatively low speed, and to providing a radar apparatus provided with the clutter suppressing device.

According to an aspect of this disclosure, a clutter suppressing device is provided. The clutter suppressing device suppresses echo data of reflection waves caused by radar transmission signals reflecting on a static object, each of the radar transmission signals transmitted at a predetermined azimuth from a radar antenna at a predetermined time interval. The clutter suppressing device includes an echo data memory configured to sequentially store a plurality of echo data of reflection waves caused by the radar transmission signals reflecting on objects, a filter configured to select, from the plurality of echo data stored in the echo data memory, a data row in the azimuth direction for a predetermined distance, and suppress, in the data row, echo data of a target object moving at a speed within a predetermined range, and a suppression echo data output unit configured to output suppression echo data containing the echo data suppressed by the filter.

By this configuration, the filter suppresses the echo data of the target object moving at the speed within the predetermined range. Thus, by setting the speed range to a desirable range, the echo data of the static object can be suppressed without suppressing the echo data of an observation target moving at a comparatively low speed.

The predetermined range of the speed at which the target object moves may include zero speed.

By this configuration, the filter suppresses the echo data of the target object moving at the speed within the predetermined range including zero speed. Thus, by setting the speed range to the desirable range, the echo data of the static object can be suppressed without suppressing the echo data of the observation target moving at the comparatively low speed.

The filter preferably has the following configuration. The clutter suppressing device includes a suppression echo data memory configured to store the suppression echo data outputted from the suppression echo data output unit, a first weighting module configured to weight each data of the data row in the azimuth direction for the predetermined distance selected from the plurality of echo data stored in the echo data memory, and obtain a first sum value of the weighted data, and a second weighting module configured to select, from the suppression echo data stored in the suppression echo data memory, a data row in the azimuth direction for the predetermined distance, weight each data of the data row, and obtain a second sum value of the weighted data. The difference calculating module obtains a difference between the first and second sum values, and causes the suppression echo data output unit to output the difference as the suppression echo data.

According to another aspect of this disclosure, a radar apparatus is provided. The radar apparatus includes the clutter suppressing device described above, a radar antenna configured to transmit each of the radar transmission signals at a predetermined azimuth from the radar antenna at a predetermined time interval, a transmitter configured to output the radar transmission signal to the radar antenna, and a receiver configured to receive the plurality of echo data of the reflection waves caused by the radar transmission signals reflecting on the objects.

By this configuration, the radar apparatus includes the clutter suppressing device that suppresses the echo data of the target object moving at the speed within the predetermined range. Thus, the echo data of the static object can be suppressed without suppressing the echo data of the observation target moving at the comparatively low speed.

The radar apparatus may also include a relative speed calculating module configured to calculate a relative speed of the radar antenna with respect to the static object for the azimuth at which the radar antenna is oriented. The filter may suppress, for the azimuth at which the radar antenna is oriented, echo data of a target object moving at a relative speed within a predetermined range including the relative speed calculated by the relative speed calculating module.

By this configuration, the radar apparatus suppresses, for the azimuth at which the radar antenna is oriented, the echo data of the target object moving at the relative speed within the predetermined range including the relative speed calculated by the relative speed calculating module. Thus, even in a case where the radar apparatus is installed on a movable body, the radar apparatus can suppress the echo data of the static object without suppressing the echo data of the observation target moving at the comparatively low speed.

According to this disclosure, the clutter suppressing device having the effect of suppressing the echo data of the static object without suppressing the echo data of the observation target moving at the comparatively low speed, and the radar apparatus provided with the clutter suppressing device, can be provided.

BRIEF DESCRIPTION OF THE DRAWINGS

This disclosure is illustrated by way of example and not by way of limitation in the figures of the accompanying drawings, in which the like reference numerals indicate like elements and in which.

DETAILED DESCRIPTION

Hereinafter, embodiments of this disclosure are described with reference to the appended drawings. In the following embodiment, a clutter suppressing device according to this disclosure is applied to a meteorological radar as an example.

First Embodiment

In the first embodiment, the meteorological radar provided with the clutter suppressing device according to this disclosure and installed on land is described as an example. First, a configuration thereof is described.

Figure 1:
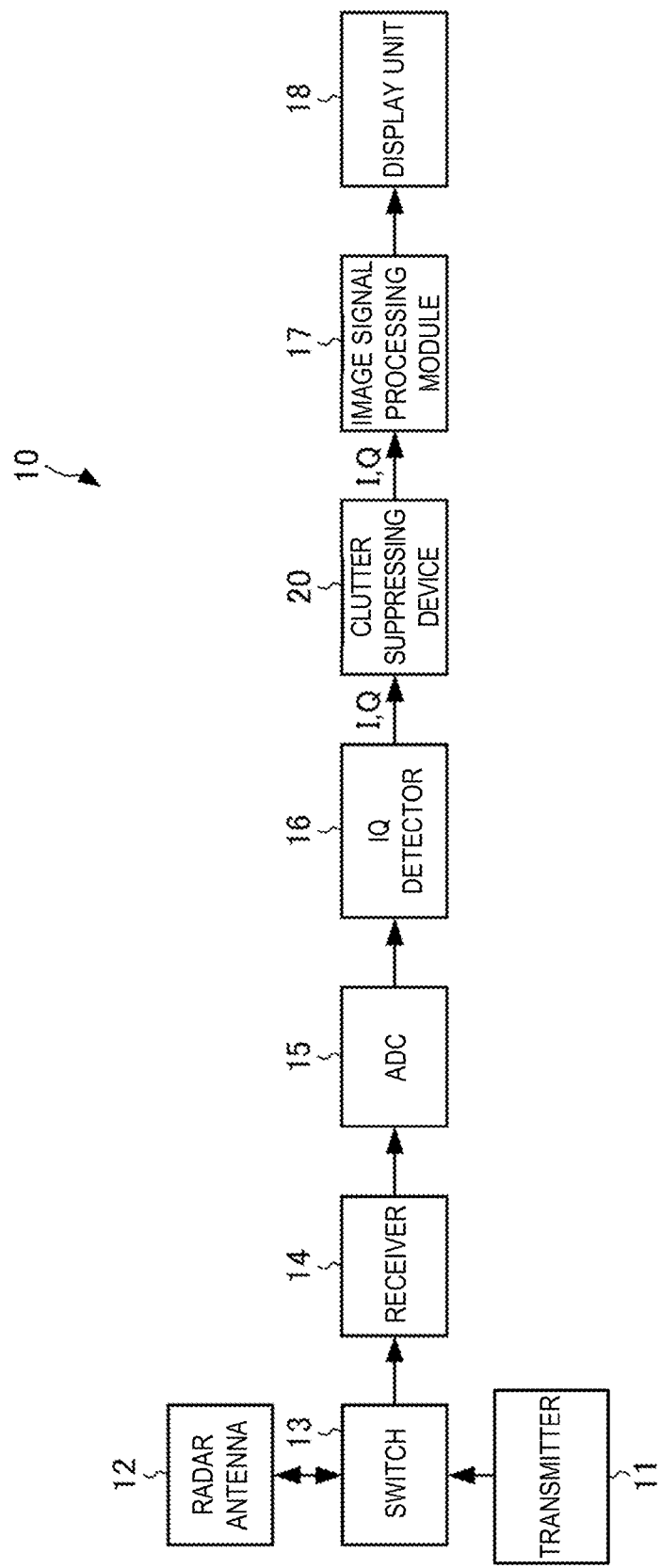
FIG. 1 is a block diagram of a radar apparatus of a first embodiment according to this disclosure.

As illustrated in FIG. 1, the meteorological radar 10 of this embodiment includes a transmitter 11, a radar antenna 12, a switch 13, a receiver 14, an analog-to-digital converter (ADC) 15, an IQ detector 16, the clutter suppressing device 20, an image signal processing module 17, and a display unit 18. Note that, the meteorological radar 10 may be referred to as the radar apparatus.

The meteorological radar 10 includes a microcomputer (not illustrated) comprised of a CPU, a ROM, a RAM, and an input/output circuit to which various interfaces are connected. The microcomputer achieves functions of the meteorological radar 10 by causing the CPU to execute control program(s) stored in the ROM.

The transmitter 11 includes a signal generator configured to generate a radar transmission signal and a frequency converter configured to convert a frequency of the generated radar transmission signal into a frequency within a predetermined frequency band. The transmitter 11 outputs the frequency-converted radar transmission signal to the radar antenna 12 via the switch 13.

While the radar antenna 12 horizontally rotates at a constant speed (e.g., one full rotation (360°) in 2.5 seconds), it discharges the radar transmission signal transmitted from the transmitter 11 at every predetermined rotational angle of the radar antenna 12 (every predetermined sweep) at a predetermined time cycle (e.g., every single millisecond), and the radar antenna 12 receives radar reception signals including, as object signal components, reception signals which are reflection waves caused by the radar transmission signals reflecting on object(s). A distance from the radar antenna 12 to the object is obtained based on a difference between a reception time point of the radar reception signal containing the object signal components and a transmission time point of the radar transmission signal corresponding to the radar reception signal. Further, an azimuth of the object is obtained based on the azimuth to which the radar antenna 12 is oriented when it transmits the radar transmission signal corresponding to the radar reception signal.

The switch 13 outputs the radar transmission signal generated by the transmitter 11 to the radar antenna 12 and outputs the radar reception signal received by the radar antenna 12 to the receiver 14, and switches its operation therebetween.

The receiver 14 includes a frequency converter configured to convert a frequency of the radar reception signal received via the switch 13, and outputs the frequency-converted radar reception signal to the ADC 15.

Here, the receiver 14 outputs per radar reception signal caused by a single transmission of the radar transmission signal, as echo data for one sweep. For example, in a case where the radar antenna 12 fully rotates once in six seconds and discharges the radar transmission signal 1,000 times in one second, the receiver 14 outputs echo data for 6,000 sweeps while the radar antenna 12 fully rotates once. Echo data for one sweep includes a plurality of echo data aligned in a distance direction (time axis) obtained by a single transmission of the radar transmission signal. In a case where the object is moving, the distance from the radar antenna 12 to the object changes and the echo data from the object changes in every sweep, which leads to a conclusion that the object has a moving speed.

The ADC 15 converts an analog-formatted medium frequency signal outputted from the receiver 14 into a digital signal, and outputs it to the IQ detector 16.

Based on the digital-formatted radar reception signal outputted from the ADC 15, the IQ detector 16 generates an I-phase component and a Q-phase component different from each other in phase by π/2, and outputs them to the clutter suppressing device 20.

By a configuration described later, the clutter suppressing device 20 suppresses clutter components in the radar reception signal (specifically, echo data of the reflection waves caused by the radar transmission signal reflecting on the target object) in terms of the I- and Q-phase components, and outputs the radar reception signal to the image signal generating module 17. Note that, although not illustrated, an interference removing device is preferably provided to operate before the clutter suppressing device 20 so as to prevent interference with an electromagnetic wave transmitted from another radar apparatus. Examples of a known interference removing device include a device disclosed in JP2011-252822A.

The image signal processing module 17 performs predetermined processing on the radar reception signal suppressed in clutter component by the clutter suppressing device 20, and outputs it to the display unit 18. The predetermined processing may include adjusting an amplitude or sensitivity for the radar reception signal, performing a logarithmic display of the radar reception signal on the display unit 18, determining and displaying a rain amount on the display unit 18, etc.

The display unit 18 is, for example, comprised of a liquid crystal display, and displays the radar reception signal outputted from the image signal processing module 17.

Next, the outline of the clutter suppressing device 20 is described in comparison with a MTI processing device which performs conventional MTI processing, based on FIGS. 2A and 2B, and FIGS. 3A and 3B.

Figure 2A:
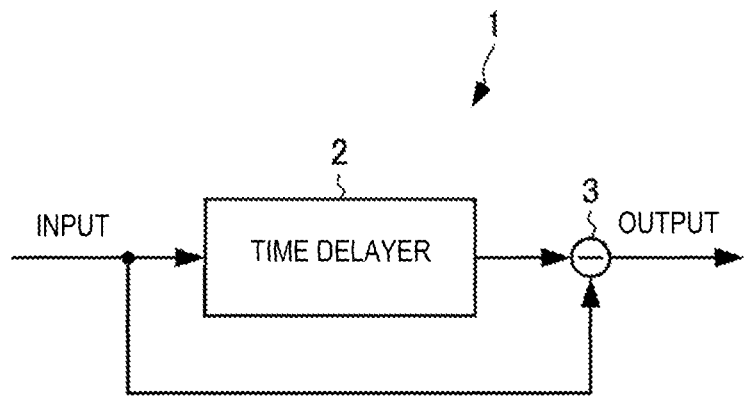
FIGS. 2A and 2B are views illustrating a conceptual configuration of a conventional MTI processing device and a filter characteristic thereof, respectively.

FIG. 2A illustrates a conceptual configuration of the conventional MTI processing device 1. The conventional MTI processing device 1 includes a time delayer 2 for delaying the input signal to be inputted in every sweep by a period of time corresponding to one sweep, and a subtractor 3 for calculating a difference in intensity between a latest input signal and an input signal of one sweep before the latest input signal.

Figure 2B:
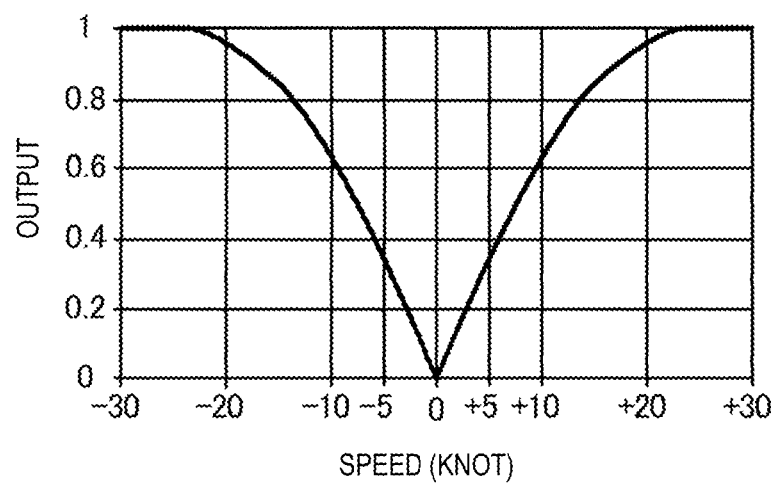

In order to find the cause of suppression on echo components of an object when static clutter components are suppressed by the conventional MTI processing device 1, the present inventors focused on filter characteristic with respect to a moving speed of the object indicated by data aligned in the sweep direction (azimuth direction), and obtained a filter characteristic of the conventional MTI processing device 1 illustrated in FIG. 2B. In FIG. 2B, the lateral axis indicates the speed of the object and the vertical axis indicates a standardized output. Note that, the positive (+) and negative (−) symbols for speed indicate whether the object is moving closer to (e.g., positive symbol) or farther from (e.g., negative symbol) the meteorological radar 10.

As illustrated in FIG. 2B, in the filter characteristic of the conventional MTI processing device 1, the output level deteriorates comparatively greatly even when the speed of the object is 5 or 10 knots. This characteristic indicates that with the conventional MTI processing device 1, if the static clutter components around the speed of 0 knot are to be suppressed, the echo components of the object moving at the comparatively low speed (e.g., 5 or 10 knots) will also be suppressed. On the contrary, if the echo components of the object moving at the comparatively low speed (e.g., 5 or 10 knots) are to be avoided from being suppressed, the static clutter components around the speed of 0 knot will also not be suppressed.

Thus, through conducting studies on the improvement in filter characteristic over and over again, the present inventors invented the clutter suppressing device 20 configured to sequentially receive the echo data for a plurality of sweeps, selecting, from echo data for the plurality of sweeps, a data row in the azimuth direction for a predetermined distance, and weighting each data of the data row in real time. Thus, the present inventors have solved the above raised problems.

Figure 3A:
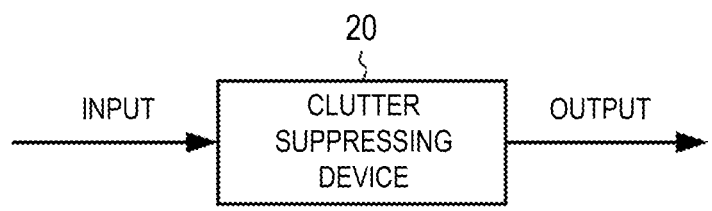
FIGS. 3A and 3B are views illustrating a conceptual configuration of a clutter suppressing device of the first embodiment according to this disclosure and a filter characteristic thereof, respectively.

A conceptual configuration of the clutter suppressing device 20 is illustrated in FIG. 3A. The clutter suppressing device 20 has a filter characteristic indicated by Equation 1. Due to having this filter characteristic, the clutter suppressing device 20 functions as a kind of high-pass filter which allows the echo components of objects moving at a predetermined speed or higher to pass.

$$Y_i = \frac{1}{a_0}\left(\sum_{j=0}^{N_b-1} b_j X_{i-j} - \sum_{k=1}^{N_a-1} a_k Y_{i-k}\right) \quad (1)$$

Here, X indicates input data, and Y indicates a result of filtering the input data X. i indicates the number of the sweep data. $b_j$ indicates a coefficient to be weighted on the input data $X_{i-j}$, $N_b$ indicates the number of the coefficients, $a_k$ indicates an inverse coefficient to be weighted on output data $Y_{i-k}$, and $N_a$ indicates the number of the inverse coefficients. j and k indicate integers for specifying targets to be weighted, respectively.

In Equation 1, the filter characteristic is determined based on the coefficient $b_j$ and the inverse coefficient $a_k$. Since extremely complicated operations are required for obtaining the coefficient $b_j$ and the inverse coefficient $a_k$, it is preferred to obtain a desirable filter characteristic by using a designing tool of an Infinite Impulse Response (IIR) filter, for example.

Note that, this disclosure is not achieved by simply applying a general IIR filter. If simply applying a conventional IIR filter, the weighting is performed along the time axis, in other words, along the data in the distance direction contained in the echo data for one sweep. Whereas, the clutter suppressing device 20 is revised in that by weighting in real time each echo data of the data row in the azimuth direction for the predetermined distance selected from the echo data for the plurality of sweeps, the inclination in the filter characteristic made sharp to suppress the static clutter components.

Figure 3B:
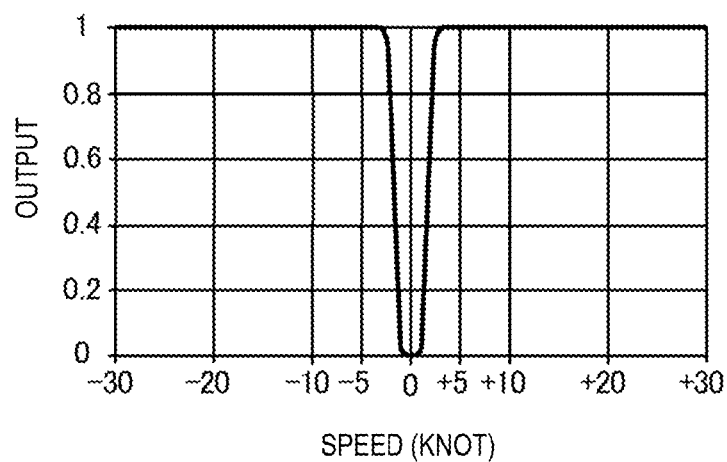

Specifically, the filter characteristic of the clutter suppressing device 20 is illustrated in FIG. 3B. The filter characteristic in FIG. 3B is designed so as to suppress the echo components of a target object having a speed within a range of ±3 knots including 0 knot. As illustrated in FIG. 3B, the clutter suppressing device 20 of the meteorological radar 10 installed on land can suppress only the target object moving at the speed of around 0 knot. Thus, the suppression of only the static clutter components can surely be performed without suppressing the echo components of the object moving at the comparatively low speed (e.g., 5 or 10 knots). As a result, the meteorological radar 10 can improve the accuracy of the rain amount calculation in meteorological observation.

Note that, for example, the numbers of the coefficient $b_j$ and the inverse coefficient $a_k$ can arbitrarily be determined by taking the processing time period and the desirable filter characteristic into consideration. In this case, the number of memories on the input side and the number of memories on the output side for data are determined according to the numbers of the coefficient $b_j$ and the inverse coefficient $a_k$, respectively. Further, the filter characteristic of the clutter suppressing device 20 may be designed based on a filter characteristic of a digital filter other than the IIR filter, for example a Finite Impulse Response (FIR) filter.

Next, a specific configuration of the clutter suppressing device 20 is described with reference to FIG. 4.

Figure 4:
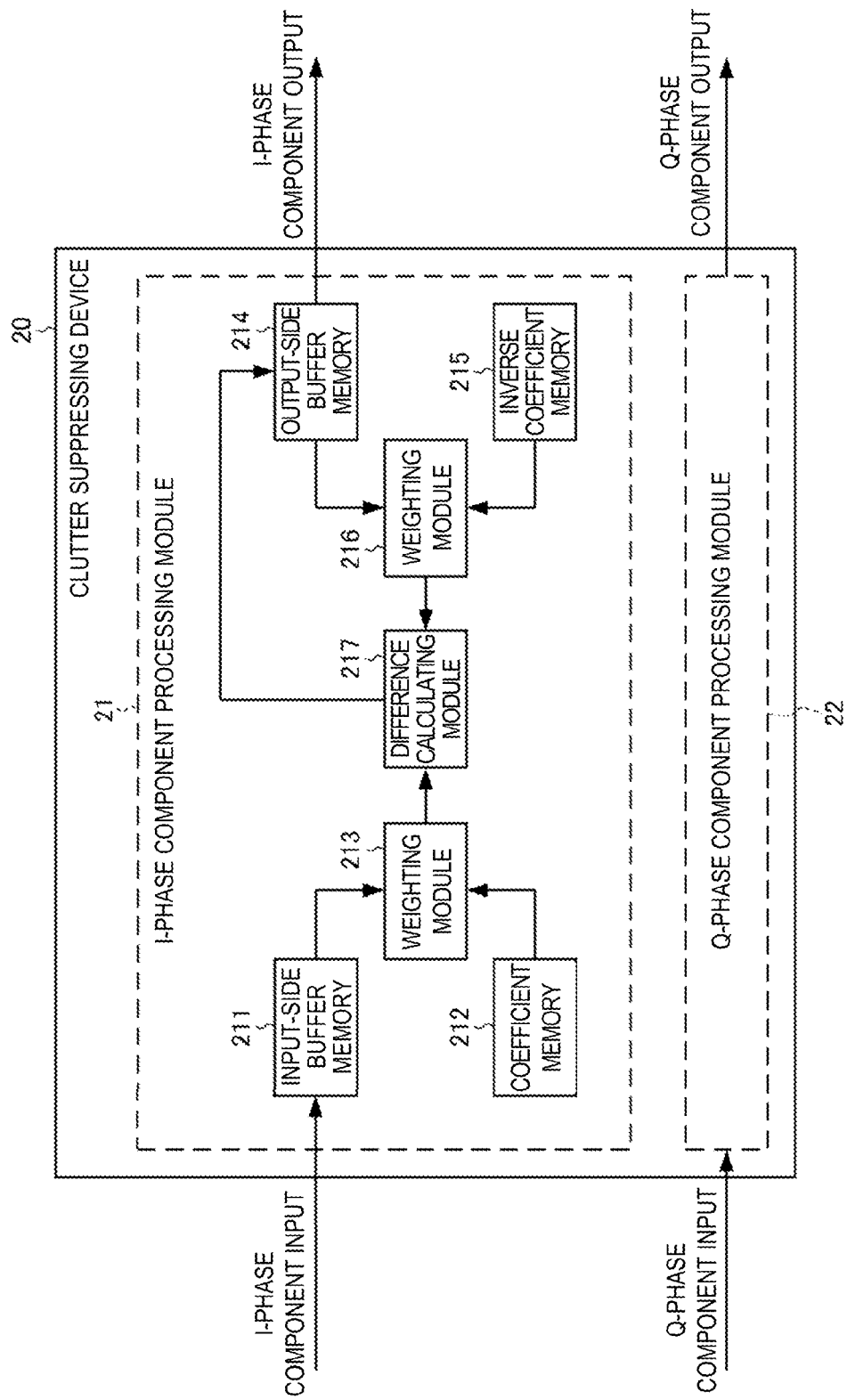
FIG. 4 is a block diagram of the clutter suppressing device of the first embodiment according to this disclosure.

As illustrated in FIG. 4, the clutter suppressing device 20 includes an I-phase component processing module 21 and a Q-phase component processing module 22 which operate in real time. The modules 21 and 22 have a similar configuration except that their input and output signals are different. Therefore, in the following description, the I-phase component processing module 21 is described while the description of the Q-phase component processing module 22 is omitted. Note that, the I- and Q-phase component processing modules 21 and 22 may comprehensively be referred to as a filter.

The I-phase component processing module 21 includes, on its input side for data, an input-side buffer memory 211, a coefficient memory 212, and a weighting module 213. Further, the I-phase processing module 21 includes, on its output side for data, an output-side buffer memory 214, an inverse coefficient memory 215, and a weighting module 216. Moreover, the I-phase component processing module 21 includes a difference calculating module 217 connected with the weighting modules 213 and 216.

The input-side buffer memory 211 sequentially receives I-phase components of the echo data for the plurality of sweeps, and temporarily stores each received echo data in association with sweep direction (azimuth direction) and distance in real time. In this embodiment, the input-side buffer memory 211 can store echo data for six sweeps in real time. Note that, the input-side buffer memory 211 may be referred to as the echo data memory.

The coefficient memory 212 stores predetermined coefficients. In this embodiment, the coefficient memory 212 stores six coefficients.

The weighting module 213 weights the echo data for each sweep by multiplying, with each coefficient stored in the coefficient memory 212, each data of the data row in the azimuth direction for the predetermined distance selected from the echo data for each of the plurality of sweeps temporarily stored in the input-side buffer memory 211, and the weighting module 213 outputs the result to the difference calculating module 217. The weighting module 213 may be referred to as the first weighting module.

The output-side buffer memory 214 sequentially receives suppression echo data (described later) obtained by the difference calculating module 217, and temporarily stores each received suppression echo data in association with sweep direction (azimuth direction) and distance in real time. In this embodiment, the output-side buffer memory 214 can store six suppression echo data in real time. Note that, the output-side buffer memory 214 may be referred to as the suppression echo data output unit and the suppression echo data memory.

The inverse coefficient memory 215 stores predetermined inverse coefficients. In this embodiment, the inverse coefficient memory 215 stores six inverse coefficients.

The weighting module 216 weights the echo data for each sweep by multiplying, with each inverse coefficient stored in the inverse coefficient memory 215, each data of a data row in the azimuth direction for the predetermined distance selected from the suppression echo data for each of the plurality of sweeps temporarily stored in the output-side buffer memory 214, and the weighting module 216 outputs the result to the difference calculating module 217. The weighting module 216 may be referred to as the second weighting module.

The difference calculating module 217 obtains echo data indicating a difference between the echo data weighted by the weighting modules 213 and 216 (suppression echo data), and outputs it to the output-side buffer memory 214.

Next, operation of the clutter suppressing device 20 of this embodiment is described in detail with reference to FIG. 5.

Figure 5:
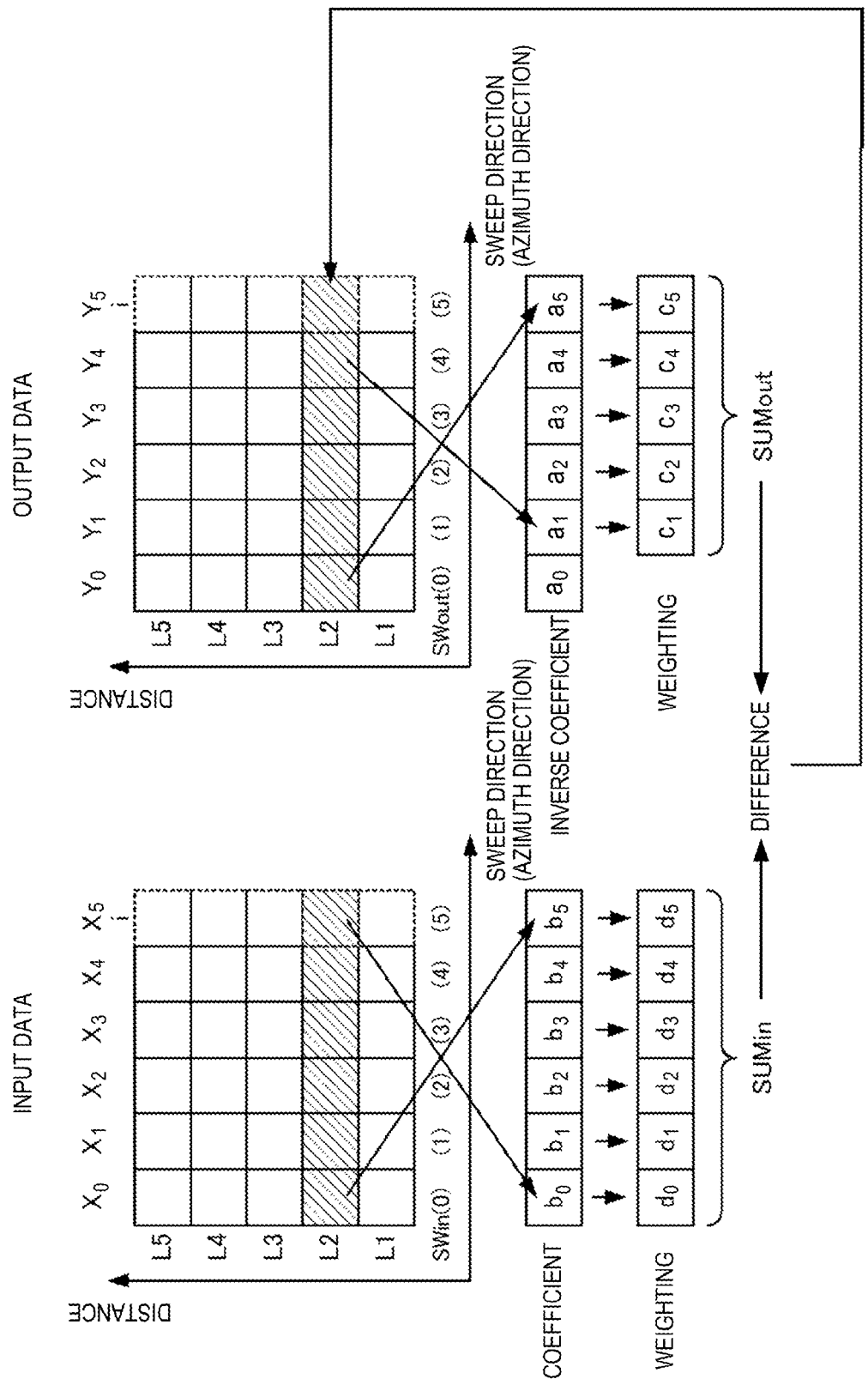
FIG. 5 is a view for describing operation of the clutter suppressing device of the first embodiment according to this disclosure.

FIG. 5 is a view for describing a process of obtaining filtered output data $Y_5$ when $N_a=N_b=6$ in Equation 1. In FIG. 5, to simplify the description, the number of the plurality of echo data aligned in the distance direction (time axis) is five, and the distances of the plurality of echo data are L1 to L5, respectively. When $a_0=1$ in Equation 1, the output data $Y_5$ is obtained based on Equation 2.

$$Y_5 = \sum_{j=0}^{5} b_j X_{5-j} - \sum_{k=1}^{5} a_k Y_{5-k} \qquad (2)$$

As illustrated in the upper left part of FIG. 5, the input-side buffer memory 211 sequentially receives the echo data for the respective sweeps and temporarily stores each received echo data in association with sweep direction (azimuth direction) and distance in real time. Here, when the echo data for an i-th sweep (i=0, 1, 2 . . . ) is indicated as SWin(i), the upper left part of FIG. 5 indicates a state where i=5, and SWin(5) is inputted into the input-side buffer memory 211 after SWin(0) to SWin(4) are sequentially buffered in real time.

On the other hand, the coefficient memory 212 stores six coefficients $b_0$ to $b_5$ as illustrated in FIG. 5.

When SWin(5) is inputted into the input-side buffer memory 211, the weighting module 213 multiplies data of the data row in the azimuth direction for the predetermined distance (L1 to L5) selected from SWin(0) to SWin(5) by the respective coefficients $b_0$ to $b_5$, and obtains a sum value SUMin (first sum value) on the input side by adding the respective products.

Specifically, for example at the distance L2, the weighting module 213 obtains a product $d_5$ between the data $X_0$ of SWin(0) and the coefficient $b_5$, a product $d_4$ between the data $X_1$ of SWin(1) and the coefficient $b_4$, . . . , and a product do between the data $X_5$ of SWin(5) and the coefficient $b_0$. Then, the weighting module 213 obtains a sum value SUMin of the products $d_0$ to $d_5$ at the distance L2, and outputs the obtained sum value SUMin to the difference calculating module 217.

The difference calculating module 217 obtains a difference between the sum value SUMin obtained by the weighting module 213 and a later-described sum value SUMout on the output side (second sum value), and successively updates the data in the output-side buffer memory 214 by outputting the obtained difference as SWout(i) to the output-side buffer memory 214. The output-side buffer memory 214 successively updates the output data for each sweep by sequentially outputting SWout(i). As a result, the clutter suppressing device 20 outputs in real time the suppression echo data suppressed only in the static clutter components.

Next, as illustrated in the upper right part of FIG. 5, the output-side buffer memory 214 sequentially receives SWout (i) which is the i-th suppression echo data from the difference calculating module 217, and temporarily stores each received suppression echo data in association with sweep direction (azimuth direction) and distance in real time. The upper right part of FIG. 5 indicates a state where SWout(5) is inputted into the output-side buffer memory 214 after SWout(0) to SWout(4) are sequentially buffered in real time.

On the other hand, the inverse coefficient memory 215 stores six inverse coefficients $a_0$ to as $a_5$ illustrated in FIG. 5.

When SWout(5) is inputted into the output-side buffer memory 214, the weighting module 216 multiplies each data of the data row in the azimuth direction for the predetermined distance selected from SWout(0) to SWout(4) by the inverse coefficients $a_1$ to $a_5$, and obtains the sum value SUMout on the output side by adding the respective products.

Specifically, for example at the distance L2, the weighting module 216 obtains a product $c_5$ between the data $Y_0$ of SWout(0) and the inverse coefficient as, a product $c_4$ between the data $Y_1$ of SWout(1) and the inverse coefficient $a_4$, . . . , and a product $c_1$ between the data $Y_4$ of SWout(4) and the inverse coefficient $a_1$. Then, the weighting module 216 obtains a sum value SUMout of the products $c_1$ to $c_5$ at the distance L2.

Note that, although the above description is given only regarding the distance L2, the weighting modules 213 and 216 similarly obtain sum values SUMin and SUMout in terms of the other distances L1 and L3 to L5, respectively.

Further, when SWin(6) is inputted successively to SWin (5), the input-side buffer memory 211 shifts SWin(1) to SWin(5) to the current memory locations for SWin(0) to SWin(4) to overwrite, and stores SWin(6) at the current memory location for SWin(5). Similarly, the shifting and overwriting of the data are also performed at the output-side buffer memory 214 and newly-obtained SWout(6) is stored at the current memory location for SWout(5). Hereinafter, every time the data is inputted, the input- and output-side buffer memories 211 and 214 similarly repeat the shifting and overwriting of the data.

Moreover, in FIG. 5, although the state where the input- and output-side buffer memories 211 and 214 are full is given as an example, the data outputted from the output-side buffer memory 214 in a period from the buffer memories starting to buffer until the buffer memories becomes full is preferably considered as data in a transient response period and discarded.

By the above operation, based on the filter characteristic illustrated in FIG. 3B, the clutter suppressing device 20 can surely suppress only the static clutter components which is the echo components of land, a building, etc., without suppressing the echo components of cloud or rain which moves comparatively slow (e.g., 5 or 10 knots).

Since the meteorological radar 10 of this embodiment includes the clutter suppressing device 20 configured to suppress the echo components of the target object moving at a speed within the predetermined range including zero speed as above, the static clutter components can be suppressed without suppressing the echo components of the observation target moving at a comparatively low speed. As a result, the meteorological radar 10 of this embodiment can improve in accuracy of the rain amount calculation in the meteorological observation.

Note that, in this embodiment described above, the example in which the clutter suppressing device of this disclosure is applied to the meteorological radar is given; however, this disclosure is not limited to this, and it may also be applied to any radar other than the meteorological radar, and similar effects can be obtained.

Moreover, in this embodiment, the example in which the clutter components are suppressed in real time by weighting each data of the data row in the azimuth direction for the predetermined distance selected from the inputted echo data is given; however, instead of processing in real time, for example, all echo data of the entire area of the observation target may be obtained before selecting, from all the echo data, a data row in the azimuth direction for the predetermined distance and weighting each data of the data row.

Second Embodiment

In a second embodiment of this disclosure, a radar apparatus provided with the clutter suppressing device according to this disclosure and installed in a ship is described as an example. Note that, the same reference numerals are denoted to configurations similar to/same as the configurations of the first embodiment, and description thereof is omitted.

Figure 6:
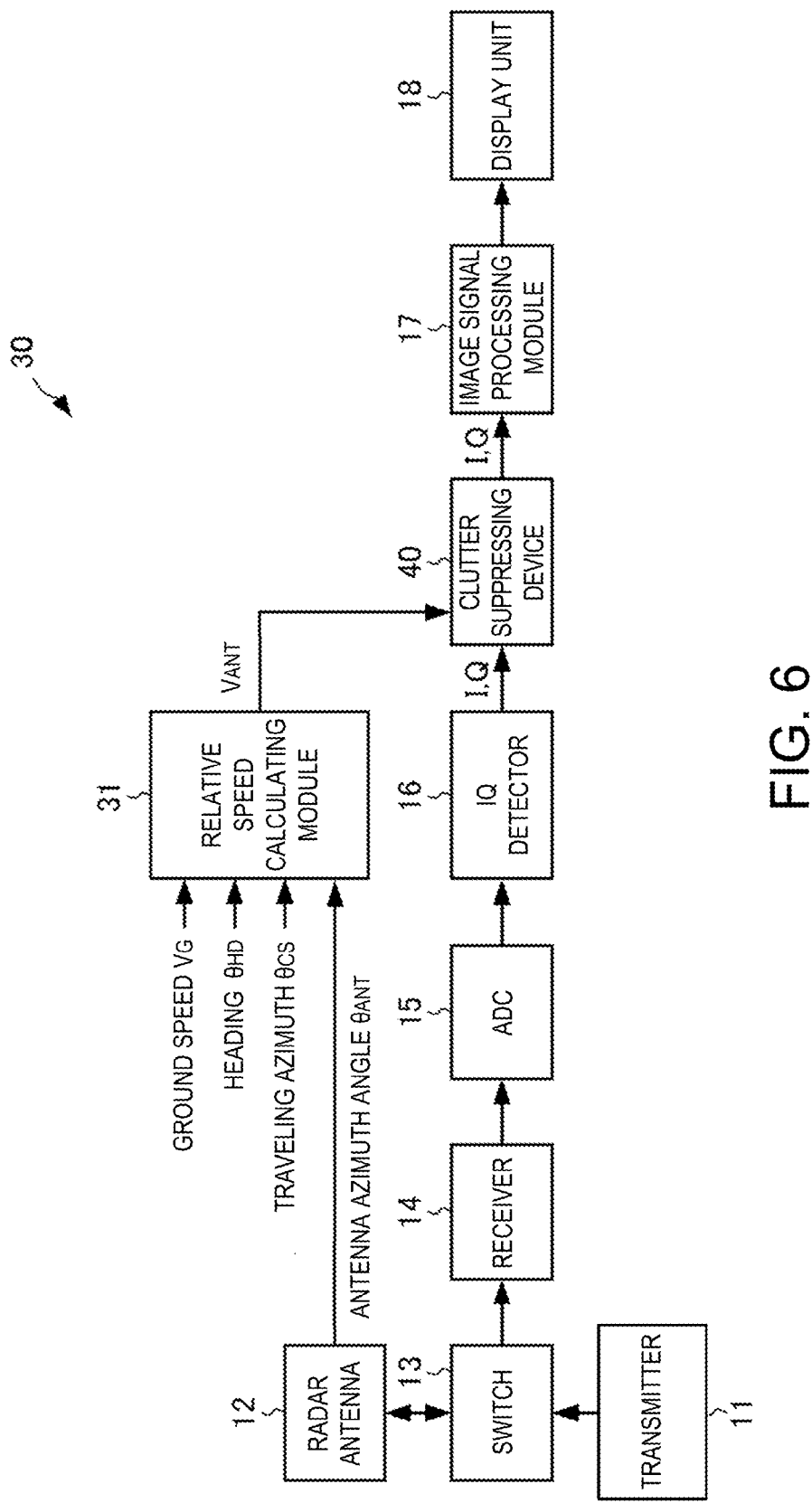
FIG. 6 is a block diagram of a radar apparatus of a second embodiment according to this disclosure.

As illustrated in FIG. 6, the radar apparatus 30 of this embodiment includes a relative speed calculating module 31 configured to calculate a relative speed between the radar apparatus 30 and land, and a clutter suppressing device 40 configured to suppress clutter components.

Although the illustration is omitted, the relative speed calculating module 31 is connected with measuring devices installed in the ship (e.g., Global Positioning System (GPS), gyrocompass, satellite compass). Further, the respective speed calculating module 31 acquires, from the measuring device, respective data of a ground speed $V_G$ which is a speed of the ship with respect to the ground, of a heading AHD which is an azimuth to which the bow of the ship is oriented with respect to North, and of a traveling azimuth $\theta_{CS}$ which is a direction in which the ship travels with respect to North.

Moreover, the relative speed calculating module 31 is connected with the radar antenna 12, and, based on a pulse number of a stepping motor configured to rotate the radar antenna 12 and an output signal of an angle detecting device, the relative speed calculating module 31 acquires data of an antenna azimuth angle $\theta_{ANT}$ which is an azimuth to which a main robe of the radar antenna 12 is oriented with respect to the heading AHD.

Figure 7:
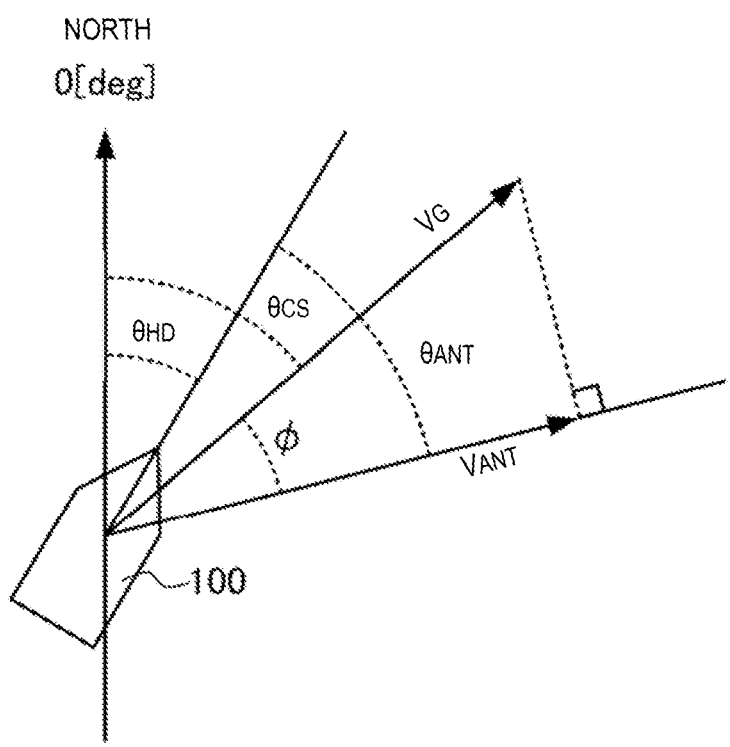
FIG. 7 is a conceptual view illustrating relationship among a speed component in an antenna azimuth of the ship, an antenna azimuth angle, a ground speed, a heading, and a traveling azimuth, in the radar apparatus of the second embodiment according to this disclosure.

FIG. 7 is a conceptual view illustrating relationship among a speed component $V_{ANT}$ of the antenna azimuth of the ship 100, the antenna azimuth angle RANT, the ground speed $V_G$, the heading AHD, and the traveling azimuth $\theta_{CS}$. A predetermined relative angle $\phi$ illustrated in FIG. 7 indicates an angle between the traveling azimuth and the antenna azimuth of the ship 100, and is given based on Equation 3.

$$\phi = \theta_{ANT} + \theta_{HD} - \theta_{CS} \qquad (3)$$

The relative speed calculating module 31 calculates the relative speed component $V_{ANT}$ in the antenna azimuth at the predetermined relative angle $\phi$ based on Equation 4. Data of the calculated relative speed component $V_{ANT}$ in the antenna azimuth is outputted to the clutter suppressing device 40.

$$V_{ANT} = V_G \cdot \cos(\phi) \qquad (4)$$

Figure 8:
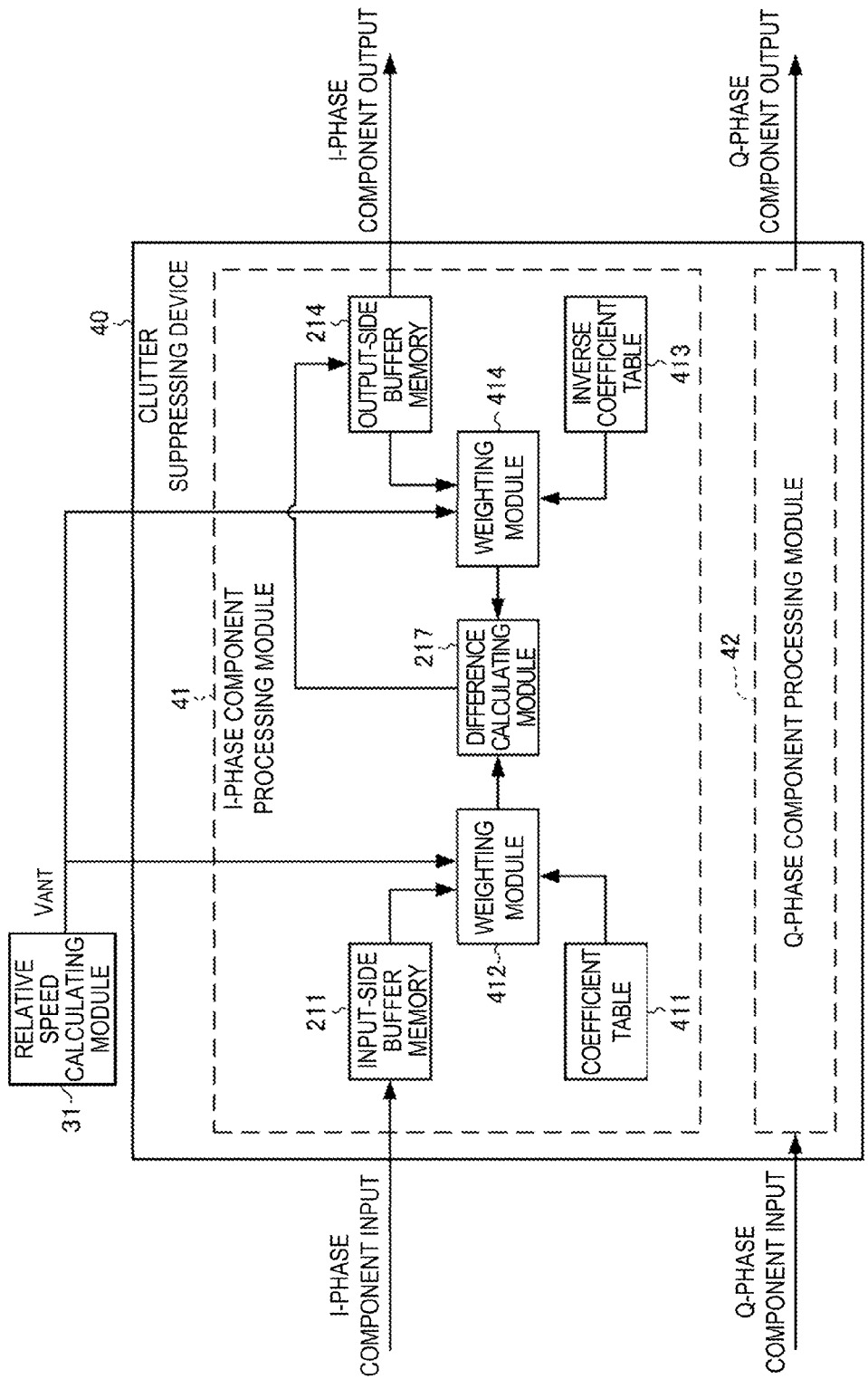
FIG. 8 is a block diagram of a clutter suppressing device of the second embodiment according to this disclosure.

As illustrated in FIG. 8, the clutter suppressing device 40 includes an I-phase component processing module 41 and a Q-phase component processing module 42 configured to operate in real time. The modules 41 and 42 have a similar configuration except that their input and output signals are different. Therefore, in the following description, the I-phase component processing module 41 is described, and the description of the Q-phase component processing module 42 is omitted.

The I-phase component processing module 41 includes, on its input side for data, a coefficient table 411 and a weighting module 412. Further, the I-phase component processing module 41 includes, on its output side for data, an inverse coefficient table 413 and a weighting module 414.

The coefficient table 411 stores a table of data indicating relationship of the relative speed component $V_{ANT}$ in the antenna azimuth with a plurality of (e.g., six) predetermined coefficients determined to have a sharp inclination in the filter characteristic (see Equation 1) with respect to the speed component.

The weighting module 412 receives the data of the relative speed component $V_{ANT}$ in the antenna azimuth from the relative speed calculating module 31, and acquires the respective coefficients with respect to the relative speed component $V_{ANT}$ in the antenna azimuth with reference to the coefficient table 411. Further, the weighting module 412 weights the echo data for each sweep by multiplying, with each coefficient acquired by referring to the coefficient table 411, each data of the data row in the azimuth direction for the predetermined distance selected from the echo data for each of the plurality of sweeps temporarily stored in the input-side buffer memory 211, and the weighting module 412 outputs the result to the difference calculating module 217.

The inverse coefficient table 413 stores a table of data indicating relationship of the relative speed component $V_{ANT}$ in the antenna azimuth with a plurality of (e.g., six) predetermined inverse coefficients determined to have a sharp inclination in the filter characteristic (see Equation 1) with respect to the speed component.

The weighting module 414 receives the data of the relative speed component $V_{ANT}$ in the antenna azimuth from the relative speed calculating module 31, and acquires the respective inverse coefficients with respect to the relative speed component $V_{ANT}$ in the antenna azimuth with reference to the inverse coefficient table 413. Further, the weighting module 414 weights the echo data for each sweep by multiplying, with each inverse coefficient acquired by referring to the inverse coefficient table 413, each data of the data row in the azimuth direction for the predetermined distance selected from the suppression echo data for each of the plurality of sweeps temporarily stored in the output-side buffer memory 214, and the weighting module 414 outputs the result to the difference calculating module 217.

As a result, the clutter suppressing device 40 can output in real time the suppression echo data suppressed only in the static clutter components, even in the state of being installed in the ship.

Figure 9:
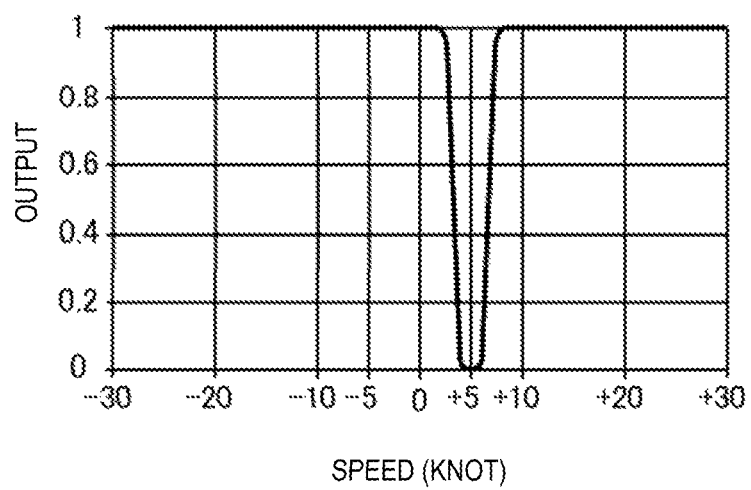
FIG. 9 is a view illustrating one example of a filter characteristic of the clutter suppressing device of the second embodiment according to this disclosure.

Specifically, for example, in a case where the speed component $V_{ANT}$ in a certain antenna azimuth is 5 knots (the ship is approaching the land at 5 knots), in the antenna azimuth, as illustrated in FIG. 9, the filter characteristic is set to suppress the echo components of the target object moving at a relative speed within a range of ±3 knots including the relative speed=5 knots. Note that, the filter characteristic is similarly designed in a case where the ship travels away from the land a certain relative speed.

In other words, the clutter suppressing device 40 functions as a Band Stop Filter (BSF) configured to only suppress, for each antenna azimuth, the echo components of the target object moving at a relative speed within a predetermined range centering on the speed component $V_{ANT}$ in the antenna azimuth.

As described above, the radar apparatus 30 of this embodiment suppresses, for each azimuth, the echo components of the target object moving at a relative speed within the predetermined range including the relative speed calculated by the relative speed calculating module 31. Therefore, even in the case of being installed in a movable body (e.g., ship), the radar apparatus 30 can suppress the static clutter components without suppressing the echo components of the observation target moving at a comparative low speed.

Additionally, with the conventional radar which performs MTI processing, since it suppresses the echo components of which Doppler speed is zero, the conventional radar needs to operate in a steady state (not moving), and therefore, if it is installed in a movable body (e.g., ship), the static clutter components cannot be suppressed. On the other hand, with the radar apparatus 30 of this embodiment, as described above, even if it is installed in a movable body (e.g., ship), the static clutter components can be suppressed without suppressing the echo components of the observation target moving at a comparative low speed.

Note that, in the above embodiments, the example in which the radar apparatus 30 is installed in the ship is described; however, it is not limited to this, and similar effects can be obtained even if the radar apparatus 30 is installed in another movable body other than the ship.

As described above, the clutter suppressing device and the radar apparatus provided with the clutter suppressing device according to this disclosure exert the effect of suppressing the static clutter components without suppressing the echo components of the observation target moving at a comparatively low speed, and are useful as a clutter suppressing device and a radar apparatus provided with the clutter suppressing device configured to suppress a static clutter components contained in a reception signal of a meteorological radar, etc.

In the foregoing specification, specific embodiments of this disclosure have been described. However, one of ordinary skill in the art appreciates that various modifications and changes can be made without departing from the scope of this disclosure as set forth in the claims below. Accordingly, the specification and figures are to be regarded in an illustrative rather than a restrictive sense, and all such modifications are intended to be included within the scope of this disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A clutter suppressing device for suppressing echo data of reflection waves caused by radar transmission signals reflecting on a static object, each of the radar transmission signals transmitted at a predetermined azimuth from a radar antenna at a predetermined time interval, the clutter suppressing device comprising:
    an echo data memory configured to sequentially store a plurality of echo data of reflection waves caused by the radar transmission signals reflecting on objects;
    a filter configured to select, from the plurality of echo data stored in the echo data memory, a data row in the azimuth direction for a predetermined distance, and suppress, in the data row, echo data of a target object moving at a speed within a predetermined range; and
    a suppression echo data output unit configured to output suppression echo data containing the echo data suppressed by the filter, wherein
    the predetermined range of the speed at which the target object moves includes zero speed, and
    the filter includes:

a suppression echo data memory configured to store the suppression echo data outputted from the suppression echo data output unit;

a first weighting module configured to weight each data of the data row in the azimuth direction for the predetermined distance selected from the plurality of echo data stored in the echo data memory, and obtain a first sum value of the weighted data;

a second weighting module configured to select, from the suppression echo data stored in the suppression echo data memory, a data row in the azimuth direction for the predetermined distance, weight each data of the data row, and obtain a second sum value of the weighted data; and a difference calculating module configured to obtain a difference between the first and second sum values, and cause the suppression echo data output unit to output the difference as the suppression echo data.

2. A radar apparatus, comprising:
the clutter suppressing device of claim 1;
the radar antenna configured to transmit each of the radar transmission signals at the predetermined azimuth from the radar antenna at the predetermined time interval;

a transmitter configured to output the radar transmission signals to the radar antenna; and a receiver configured to receive the plurality of echo data of the reflection waves caused by the radar transmission signals reflecting on the objects.

3. The radar apparatus of claim 2, further comprising a relative speed calculating module configured to calculate a relative speed of the radar antenna with respect to the static object for each azimuth at which the radar antenna is oriented, wherein the filter suppresses, for each azimuth at which the radar antenna is oriented, echo data of the target object moving at a relative speed within the predetermined range including the relative speed calculated by the relative speed calculating module.

\* \* \* \* \*